United States Patent [19]
Cole et al.

[11] 3,778,254
[45] Dec. 11, 1973

[54] BRAZING FILLER METAL FOR MOLYBDENUM

[75] Inventors: Nancy C. Cole, Knoxville, Tenn.;
Ronald W. Gunkel, Kokomo, Ind.;
Clarence W. Houck, Lake City, Tenn.

[73] Assignee: The United States of America as represented by the Atomic Energy Commission, Washington, D.C.

[22] Filed: Nov. 18, 1971

[21] Appl. No.: 200,235

[52] U.S. Cl. ............. 75/123 R, 75/123 J, 75/123 B
[51] Int. Cl. ...................... C22c 37/00, C22c 39/00
[58] Field of Search ..................... 75/123 N, 123 R, 75/123 B

[56] References Cited
UNITED STATES PATENTS 2,185,616   1/1940   Welch ............................... 75/123 B
2,754,200   7/1956   Cape ................................. 75/123 J
2,162,596   6/1939   Wyman .............................. 75/123 J
2,427,018   9/1947   Nesbitt .............................. 75/123 R
2,553,609   5/1951   Schmidt ............................. 75/123 J

*Primary Examiner*—Hyland Bizot
*Attorney*—John A. Horan

[57] ABSTRACT

This invention relates to an alloy consisting essentially of, in weight percent, adding up to 100 percent, 0.5 to 4.0 percent boron, 0.5 to 5.0 percent carbon, 15 to 30 percent molybdenum, and the balance iron. Germanium, in a range of 2 to 20 weight percent, may be added to this alloy for improved characteristics in some applications.

1 Claim, No Drawings

BRAZING FILLER METAL FOR MOLYBDENUM

BACKGROUND OF THE INVENTION

The invention described herein was made in the course of, or under, a contract with the U. S. Atomic Energy Commission.

This invention relates to novel brazing compositions for joining molybdenum and molybdenum-base alloys and to the resultant brazed composites.

Molybdenum can be welded to itself by such methods as resistance welding, ultrasonic welding, inert gas welding, and pressure welding. These processes do not lend themselves readily to the joining of complex structures, and the properties of joints made by these methods leave much to be desired. The criteria which determine whether or not a sound brazed joint between molybdenum parts is formed are influenced by metallurgical considerations as well as the intended service environment.

From a metallurgical standpoint, the presence of large grains which follows recrystallization after extended time at temperature should be avoided. These zones are very sensitive to embrittlement by residual oxygen, nitrogen, or carbon since the tolerance for such impurities decreases as the grain size increases.

The recrystallization temperature of molybdenum and molybdenum-base alloys varies with composition, prior fabrication history, and time-temperature brazing cycle. In general, any brazing alloy which can melt, wet, and flow at a temperature below 1,200°C. will not produce adverse recrystallization effects in unalloyed molybdenum. In addition, certain molybdenum-base alloys, such as TZM (Mo - 0.5% Ti - 0.1% Zr - 0.03% C) or Mo-50 Re have slightly higher recrystallization temperatures and can be brazed at temperatures slightly higher than 1,200°C.

The use of brazing filler metals that alloy with molybdenum to form brittle intermetallics, low melting eutectics, or molybdenum-containing alloys with low recrystallization temperatures should be avoided if molybdenum is to be successfully brazed to make structural assemblies for use at high temperatures.

In addition to metallurgical considerations, the braze properties that are most likely to determine the suitability of using a given alloy or procedure with molybdenum are those properties influenced by the intended service environment. Molten metals such as liquid bismuth and liquid sodium are used in the nuclear industry as a coolant or heat transfer medium; and, in the case of bismuth, as a solvent for preferentially extracting fuels and fission products from molten fluorides in a nuclear fuel reprocessing cycle. Molybdenum and alloys therof have been found to be a material of choice in fabricating container systems for use in such applications.

It is accordingly an object of this invention to provide an alloy which permits brazing of molybdenum parts and which satisfies the aforementioned metallurgical in-service temperature requirements. Of the known brazing alloys for molybdenum, many contain elements that are severely corroded by liquid bismuth or molten fluorides and others have brazing temperatures which exceed the recrystallization temperature of molybdenum.

SUMMARY OF THE INVENTION

The present invention lies in a multicomponent iron-base alloy consisting essentially of, in weight percent, 0.5 to 4.0 boron, 0.5 to 5.0 carbon, 10 to 30 molybdenum, and 2 to 20 germanium, and the balance iron. In the development work leading to the definition of this invention, alloy ingredients were correlated to obtain a composition which is at or substantially at a eutectic point, thus yielding a melting point which occurs over a relatively narrow range of temperature. Our studies led to the 0.5 of a reference iron-base alloy containing from 01.5 to 4.0 weight percent boron and 0.5 to 5.0 weight percent carbon, said alloy having a melting point in the range 1,100° to 1,150°C. Greater concentrations of boron or carbon raise the melting point beyond practical limits and results in some cases in the formation of inhomogeneous castings. Using this reference alloy, we have demonstrated successful brazed joints between molybdenum and stainless steel and molybdenum and carbon steel. Molybdenum-to-molybdenum joints also exhibited good corrosion resistance to liquid sodium and molten fluoride salts. However, they were highly corroded by contact with liquid bismuth.

According to a main inventive aspect of our invention, we discovered that additions of molybdenum, beginning with a minimum of 10 and extending througn 30 weight percent of the tatoal alloy, produce a quaternary (B-C-Mo-Fe) alloy which not only forms excellent braze joints with molybdenum parts at a temperature near or below the recrystallization temperature of molybdenum, but which is corrosion resistant to both liquid bismuth and molten fluoride salt compositions such as those used as nuclear fuel in the Molten Salt Reactor operated at the Oak Ridge National Laboratory, Oak Ridge, Tenn. Compositions containing greater than 30 weight percent result in an unduly brittle alloy for brazing purposes.

While the molybdenum-containing alloys of this invention are corrosion resistant to liquid bismuth and fused fluoride salts and exhibit excellent wetting, they flow somewhat sluggishly in some applications. We therefore include an amount of germanium to the iron-carbon-boron-molybdenum alloy at a concentration which has minimum effect on the melting point and which enhances fluidity. The effective range of germanium to be added is within the range 2 to 20 weight percent. The resultant iron-carbon-boron-molybdenum-germanium alloy is as corrosion resistant as the germanium-free alloy. At concentrations of germanium greater than 20 weight percent the fluidity effect is lost.

Examples of alloys within the scope of invention as well as the melting point of each alloy are given in the table below.

TABLE I

| Alloy Designation | Composition, wt. % | | | | | Brazing Temp. (°C.) |
|---|---|---|---|---|---|---|
| | Iron | Mo | Ge | C | B | |
| 30M | 85 | 10 | 0 | 4 | 1 | 1175 |
| 35M | 80 | 15 | 0 | 4 | 1 | 1160 |
| 36M | 70 | 25 | 0 | 4 | 1 | 1175 |
| 38M | 65 | 25 | 5 | 4 | 1 | 1150 |
| 39M | 60 | 25 | 10 | 4 | 1 | 1150 |
| 42M | 75 | 15 | 5 | 4 | 1 | 1100 |
| 44M | 78 | 15 | 2 | 4 | 1 | 1150 |
| 16M | 95 | 0 | 0 | 4 | 1 | 1150 |
| 45M | 77 | 15 | 3 | 4 | 1 | 1150 |
| 32M | 86 | 10 | 0 | 4 | 0 | 1225 |
| 37M | 65 | 30 | 0 | 4 | 1 | 1300 |
| 40M | 50 | 25 | 20 | 4 | 1 | 1300 |
| 41M | 64 | 25 | 10 | 0 | 1 | 1275 |

The alloys of this invention are prepared by arc melting a desired composition to produce an alloy button which is then fragmented to small particles and placed on faying surfaces. The particles may also be ground to powder and mixed with an organic binder to form a paste which can be painted on the faying surfaces. Prior to brazing, the molybdenum parts are cleaned by degreasing with acetone and ethyl alcohol and, optionally, etched with hot chromic acid whereupon the braze alloy is preplaced in position. Molybdenum sheet and tubing have been brazed with each of the alloys in the table in vacuum, helium, and argon atmospheres in a variety of joint designs. Both resistance and induction furnaces have been used.

Initial corrosion tests were conducted by immersing alloys 35M, 36M, and 42M in contact with static liquid bismuth. Each brazing alloy was tested for 644 hours at 600°C. After testing, the chemical analysis of the bismuth surrounding alloy 42M was less than 10 ppm iron and less than 3 ppm germanium; surrounding alloy 35M there was less than 50 ppm iron; and around 36M there was less than 10 ppm iron.

REPRESENTATIVE EMBODIMENT

Molybdenum sheets were heat-treated at time and temperature combinations similar to those employed in brazing cycles used to form brazed joints with the brazing alloys of this invention. The heat-treated sheets were then bend-tested, and those that bent 90° without cracking were called ductile. Specimens heat-treated at temperatures up to 1,180°C. and for times as long as 40 minutes were ductile. Specimens heat-treated 3 minutes at 1,200°C. bent 90°, but those heat-treated at 1,200°C. for 10 minutes achieved only a 50° bend. Since most of the iron-base alloys braze below 1,180°C. and the most promising Fe-Mo-Ge-C-B (42M) alloy brazes at 1,100°C., a sufficient safety factor is available in case the working history of other shapes or sizes, such as tubing, pots, etc., causes the base-metal recrystallization temperature to be slightly lower. The higher melting alloys (40M, 41M, 37M) can be used to braze the molybdenum alloys that have higher recrystallization temperatures.

To evaluate the mechanical properties of brazed joints made with such sheets, we shear-tested two of the most promising iron-base alloys. Shear-test specimens made of molybdenum were brazed with 42M (Fe-15 Mo-5 Ge-4 C-1 B, wt. percent) and 35M (Fe-15 Mo-4 C-1 B, wt. percent). They were pulled at a strain rate of 0.002 in./min. at both room temperature and 650°C. Average values of the test results are shown in Table II.

TABLE II

Mechanical Properties of Brazed Molybdenum Joints

| Brazing Alloy, wt. % | Shear Strength, psi | | Elongation, % | |
|---|---|---|---|---|
| | Room Temp. | 650°C. | Room Temp. | 650°C. |
| Fe-15 Mo-4 C-1 B-5 Ge (42M) | 30,000 | 29,000 | 10 | 50 |
| Fe-15 Mo-4 C-1 B (35M) | 31,000 | 18,000 | 11 | 42 |

The shear strengths are excellent for both brazes at room temperature and very good for 42M at 650°C. The elongation for both braze joints is acceptable at room temperature and excellent at 650°C.

In order to further evaluate the corrosion resistance of brazed composites of molybdenum with the braze alloys of this invention, tests were conducted in thermal convection loops containing liquid bismuth in one case and liquid bismuth containing 2 weight percent lithium in another, operating at a temperature of 700°C. and a temperature differential of from 90° to 100° C. for 2,100 hours. The loop specimens consisted of molybdenum tabs brazed with four different iron-base alloys. The iron-base braze alloys contained 4 weight percent carbon, 1 weight percent boron, varying amounts of molybdenum (0, 15, and 25 weight percent), and, in one alloy (42M), 5 weight percent germanium. We found little evidence of attack of the braze alloys containing molybdenum. However, microprobe analysis showed that the Fe-C-B braze had alloyed with the bismuth and the braze fillet contained 80 percent bismuth.

In addition, molybdenum joints brazed with three of the experimental iron-base alloys, 35M (Fe-15 Mo-4 C-1 B), 42M (Fe-15 Mo-4 C-1 B-5 Ge), and 16M (Fe-4 C-1 B, wt. percent), were corrosion-tested in a molten-salt environment. They were exposed to $LiF-BeF_2-ZrF_4-UF_4-ThF_4$ (70-23-5-1-1, mole percent) for 1,032 hours at approximately 670°C. in a Type 304L stainless steel thermal convection loop which operated at a temperature differential of 100°C. Except for a very slight weight gain, approximately 1 mg/cm², we did not see any evidence of adverse metallographic attack.

What is claimed is:

1. An alloy consisting essentially of, in weight percent, 0.5–4 percent boron, 0.5–5 percent carbon, 10–30 percent molybdenum, 2–20 percent germanium, and the balance iron.

* * * * *